April 1, 1924. 1,488,891
E. F. OETINGER
TRANSMISSION BAND
Filed Feb. 1, 1923
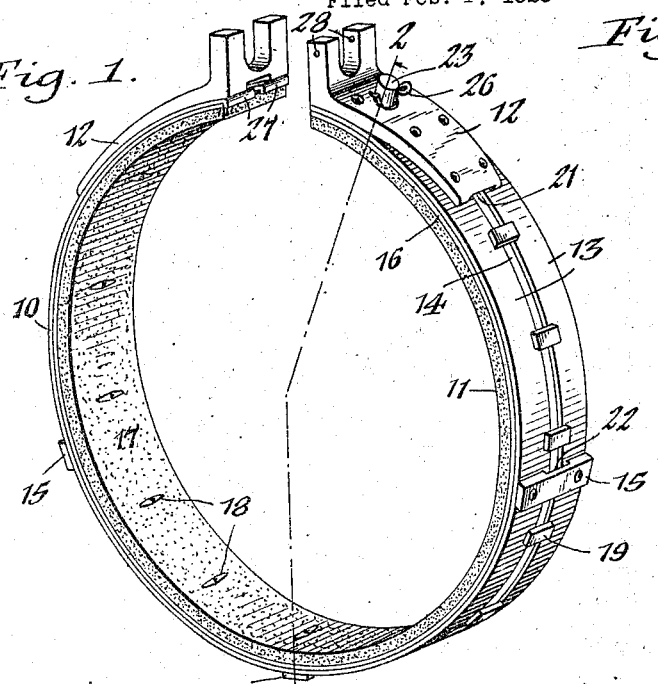
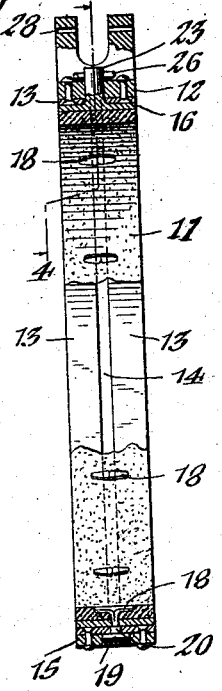
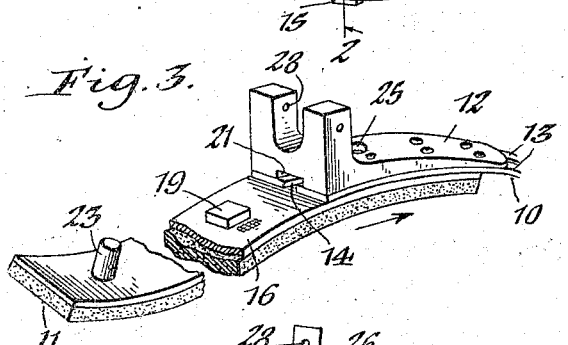
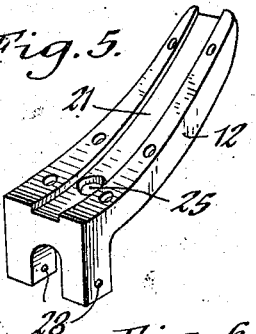
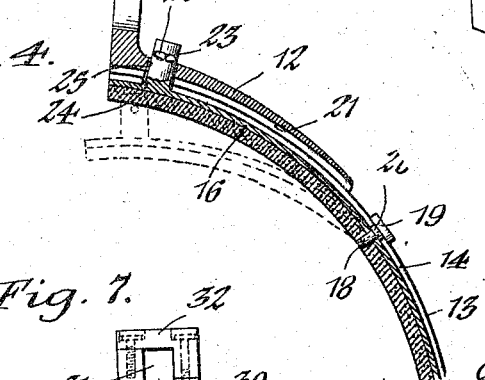
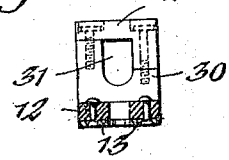
Inventor,
Elmer F. Oetinger,
by Geyer Dopp
Attorneys.

Patented Apr. 1, 1924.

1,488,891

UNITED STATES PATENT OFFICE.

ELMER F. OETINGER, OF BUFFALO, NEW YORK.

TRANSMISSION BAND.

Application filed February 1, 1923. Serial No. 616,375.

*To all whom it may concern:*

Be it known that I, ELMER F. OETINGER, a citizen of the United States, residing in Buffalo, in the county of Erie and State of New York, have invented new and useful Improvements in Transmission Bands, of which the following is a specification.

This invention relates to transmission bands which are more particularly adapted for use with the planetary transmission mechanisms of automobiles.

Its chief object is to provide a transmission band which is so constructed that the brake lining thereof may be readily replaced when worn out without removing or dismantling the band from the transmission mechanism.

Another object of the invention is to provide novel means for detachably interlocking the renewable lining with the transmission band.

A still further object is to provide a sectional, demountable band of this character which is simple and compact in construction and which is composed of few parts capable of being manufactured at a moderate cost.

In the accompanying drawings:

Figure 1 is a perspective view of a transmission band embodying my improvements. Figure 2 is a transverse vertical section thereof on line 2—2, Fig. 1. Figure 3 is a fragmentary perspective view showing the lining being attached to the outer supporting band or holder. Figure 4 is an enlarged vertical section on line 4—4, Fig. 2. Figure 5 is a perspective view of one of the attaching or coupling ears of the band. Figure 6 is a perspective view of one of the transverse tie bars for holding the outer band sections in spaced relation. Figure 7 is a sectional detail view of a modified form of coupling ear.

Similar characters of reference refer to like parts throughout the several views.

This improved band has been designed particularly for use in connection with the planetary transmission of a Ford automobile, which, as is well known, employs three rotating drums arranged side by side, including a slow speed drum, a reverse drum and a brake drum. These drums are located within a casing having a hand opening closed by a removable cover plate. The transmission bands encircling these drums are controlled by operating shafts to which are connected the usual clutch, reverse and brake pedals, respectively. At the present time, these bands are so constructed, that, when their linings become defective from wear, it is necessary to remove them bodily from their drums and substitute new ones therefor. In order to do this, it is necessary to dismember the transmission casing, thus entailing considerable time and expense in making such a replacement.

In its general organization, my transmission band comprises an outer supporting member or holder 10 adapted to encircle the drum and a removable lining member 11 movable circumferentially on said outer member, so that when the lining member becomes worn it is only necessary to replace it, leaving the outer member in position about the drum.

The outer supporting member, which constitutes a holder for the inner member, is provided on the outer side of its free ends with the customary slotted coupling ears 12 for receiving the operating shaft, (not shown). Said supporting member is preferably composed of two band-sections 13—13 arranged side by side to form an intervening circumferential guide channel or slot 14 between them. These sections are held in spaced relation at their free ends by the coupling ears and intermediate their ends by transverse tie bars or cleats 15, which may be riveted or otherwise fastened thereto.

The inner member consists of a flexible metallic band or backing strip 16 provided on its inner side with the renewable brake lining 11 secured thereto by suitable fasteners 18 having substantially rectangular-shaped heads 19. The latter project beyond the outer side of said band a distance approximately equal to the thickness of the outer band-sections 13, 13, so that the shanks 20 of the fasteners are adapted to engage the slot 14 between the latter while their heads are adapted to bear against the adjoining marginal portions of said sections, as shown in Figs. 2 and 4. By this construction, the slot 14 and fasteners 18 form complementary guiding and interlocking devices for reliably clamping the inner and the outer band members in place and yet permit the ready removal of said inner member from said outer member.

The undersides of the coupling ears 12 are provided with longitudinal grooves 21 extending from end to end thereof and the tie bars 15 are likewise provided with similar grooves 22 for receiving the fastener heads 19 during the act of applying or threading the inner band member to the outer band member, as illustrated in Fig. 3.

In order to retain the lining member 11 in place on the supporting member 10, the former is provided on its outer side near one end thereof with a radial stud 23 which is adapted to interlock with alining openings 24, 25 formed respectively in the adjoining end of the outer member and its corresponding coupling ear 12. Said stud may be provided with an opening for receiving a cotter pin 26 to reliably lock or clamp the free ends of the inner and outer members together. The opposite end of said outer member is provided with an inwardly-facing flange 27 which forms a stop for the corresponding end of the inner member and insures the proper registration of the stud 23 with its interlocking openings.

When these bands, including both inner and outer members 10 and 11, are substituted for those now in use on the planetary transmission mechanism of the type heretofore described, their application to the drums is effected in the same manner as is customary in replacing the ordinary present day bands. For such replacements, the inner and outer bands are first assembled as a complete unit preparatory to being positioned about the drums.

To remove the inner member of the band from its supporting member when the lining 11 becomes worn beyond further use, it is only necessary to remove the cover plate from the transmission case, disconnect the operating shaft from the coupling ears 12 of the band under consideration, withdraw the cotter pin 26 from the stud 23, spring the corresponding end of the inner member 16 inwardly to remove said stud from its openings 24, 25, and then pull said member outwardly until the same has been completely withdrawn from the outer member.

In replacing a new inner member for the worn one, it is passed through the cover plate opening of the transmission case and then forced around the inner side of the outer member until its free end encounters the stop flange 27, after which the stud 23 is sprung into its locking openings and the cotter pin is applied thereto.

To facilitate the holding of the outer member in place during the act of removing or applying the companion inner member, one of the coupling ears 12 may be provided with openings 28 for receiving a wire or the like, which may be held in one hand while the other is being used for handling said inner member.

One of the coupling ears of the central or slow speed band is so constructed that the latter can be shifted to one side during the insertion or removal of the lining member 11 so as to be free from interference with its operating shaft. For this purpose, as shown in Fig. 7, the lug 30 on one side of the shaft receiving slot 31 is reduced sufficiently in height to enable the coupling ear to be shifted laterally to one side of said operating shaft. A detachable yoke or extension 32 is provided for retaining the band in proper position relative to the shaft after the lining member has been properly set in place.

I claim as my invention:

1. A transmission band of the character described, comprising a supporting member, a removable lining member movable circumferentially on said supporting member, and complementary guiding and interlocking devices on said members for holding them against lateral and radial movement relative to each other.

2. A transmission band of the character described, comprising a supporting member, a removable lining member movable circumferentially on said supporting member, complementary guiding and interlocking devices on said members for holding them against lateral and radial movement relative to each other, and means for retaining the lining member against circumferential movement on said supporting member.

3. A transmission band of the character described, comprising a supporting member, a removable lining member movable circumferentially on said supporting member, complementary guiding and interlocking devices on said members for holding them against lateral and radial movement relative to each other, and complementary interlocking devices on said members for detachably holding the lining member against circumferential movement on said supporting member.

4. A transmission band of the character described, comprising a supporting band having a circumferential slot, a removable lining member movable circumferentially on said supporting band, and fastening devices on said lining member arranged to engage said slot for holding the lining member against lateral and radial movement relative to said supporting band.

5. A transmission band of the character described, comprising a supporting band having a circumferential guideway extending from end to end thereof, coupling members mounted on the free ends of said supporting band and having longitudinal grooves in their undersides in line with the guideway in said supporting band, and headed fastening devices on the lining member arranged to interlock with said guideway, the heads of said fastening devices being adapted to enter the grooves in the coupling members.

6. A transmission band of the character described, comprising a supporting band having a circumferential slot, a removable lining member movable circumferentially on said supporting band, fastening devices on said lining member arranged to engage said slot for holding the lining member against lateral and radial movement relative to said supporting band, and complementary means on the supporting band and the lining member for detachably holding the latter against circumferential movement on said supporting band.

7. A transmission band of the character described, comprising a supporting band having a circumferential guideway and an opening near one end thereof, a removable lining member movable circumferentially on said supporting member and having a stud arranged to interlock with said supporting band opening, and headed fasteners on said lining member, the shanks of said fasteners engaging said guideway and the fastener-heads bearing against the exterior face of said supporting band.

8. A transmission band of the character described, comprising a supporting band having an inwardly-extending stop flange at one end, a removable lining member of substantially the same length as said supporting band and movable circumferentially thereon, one end of said lining member being adapted to abut against said stop flange, and means for retaining the lining member in place on said supporting band.

9. A transmission band of the character described, comprising a supporting member consisting of two bands arranged side by side to form a circumferential guide channel between them, means for holding said bands in spaced relation, a removable lining member movable circumferentially on said supporting member, and means on said lining member arranged to interlock with said guide channel.

10. A wear lining for a transmission band of the character described, comprising a flexible backing strip, a lining therefor, and headed fastening devices for detachably securing the lining to its backing strip, the heads of said fastening devices being spaced from the surface of the backing strip.

ELMER F. OETINGER.